US009507073B2

(12) United States Patent
Cheol et al.

(10) Patent No.: US 9,507,073 B2
(45) Date of Patent: Nov. 29, 2016

(54) LIGHT GUIDE PLATE, BACKLIGHT ASSEMBLY AND TRANSPARENT DISPLAY

(71) Applicant: BOE TECHNOLOGY GROUP CO., LTD., Beijing (CN)

(72) Inventors: Kim Hee Cheol, Beijing (CN); Song Young Suk, Beijing (CN); Yoo Seong Yeol, Beijing (CN); Choi Seung Jin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 225 days.

(21) Appl. No.: 14/316,130

(22) Filed: Jun. 26, 2014

(65) Prior Publication Data
US 2015/0260899 A1 Sep. 17, 2015

(30) Foreign Application Priority Data

Mar. 13, 2014 (CN) .......................... 2014 1 0093857

(51) Int. Cl.
F21V 8/00 (2006.01)

(52) U.S. Cl.
CPC .......... *G02B 6/0038* (2013.01); *G02B 6/0036* (2013.01)

(58) Field of Classification Search
CPC  G02B 6/0068; G02B 6/0031; G02B 6/0073; G02B 6/0088; G02B 6/0055; G02B 6/0091; G02B 6/0036; G02B 6/0053; G02B 6/0016; G02B 1/045; G02B 6/0038; G02B 6/0018; G02B 5/045; G02B 6/0025; G02B 6/0028; G02B 6/0046; G02B 6/0041; G02B 6/00; G02B 6/0045; G02B 5/18; G02F 1/133615; G02F 2001/133607; B29D 11/00663; F21K 9/52; F21Y 2101/02; H04N 9/315
See application file for complete search history.

(56) References Cited

U.S. PATENT DOCUMENTS

| 5,079,675 | A | * | 1/1992 | Nakayama | ........... G02B 6/0038 362/23.15 |
| 5,386,347 | A | * | 1/1995 | Matsumoto | .......... G02B 6/0036 362/23.15 |
| 2007/0233218 | A1 | * | 10/2007 | Kolberg | ................. A61N 1/057 607/128 |
| 2013/0044276 | A1 | | 2/2013 | Lee et al. | |

FOREIGN PATENT DOCUMENTS

| CN | 103187989 A | 1/2014 |
| CN | 103487989 A | 1/2014 |
| KR | 20100057989 A | 6/2010 |

OTHER PUBLICATIONS

Chinese Office Action and its English translation dated Nov. 2, 2015, for corresponding Chinese Application No. 201410093857.2.
Second Chinese Office Action (including English translation) dated Mar. 21, 2016, for corresponding Chinese Application No. 201410093857.2.

* cited by examiner

Primary Examiner — Stephen F Husar
Assistant Examiner — Danielle Allen
(74) Attorney, Agent, or Firm — Kinney & Lange, P.A.

(57) ABSTRACT

The present invention discloses a light guide plate for a backlight assembly of a transparent display, the backlight assembly and the transparent display. The light guide plate comprises a transparent plate body including a light exiting surface perpendicular to a thickness direction of the light guide plate and a light incident surface perpendicular to the light exiting surface, the light from a light source is introduced into the light guide plate through the light incident surface, and the light introduced into the light guide plate through the light incident surface being emitted out of the light guide plate through the light exiting surface; and a plurality of reflecting means disposed within the plate body, the reflecting means are configured to reflect the light introduced from the light incident surface of the plate body to a plurality of light exiting zones on the light exiting surface of the plate body respectively, wherein an area of a projection of each reflecting means on a plane perpendicular to the thickness direction of the light guide plate is equal to that of a projection of each light exiting zone on the plane. The transparent display having the light guide panel or the backlight assembly has a wide applicable range.

15 Claims, 4 Drawing Sheets

LIGHT GUIDE PLATE, BACKLIGHT ASSEMBLY AND TRANSPARENT DISPLAY

CROSS-REFERENCE TO RELATED APPLICATION

This application claims the benefit of Chinese Patent Application No. 201410093857.2 filed on Mar. 13, 2014 in the State Intellectual Property Office of China, the whole disclosure of which is incorporated herein by reference.

BACKGROUND OF THE INVENTION

Field of the Invention

Embodiments of the present invention generally relate to field of display technique, in particular to a guide light plate, a backlight assembly and a transparent display.

Description of the Related Art

Liquid crystal display technique is a display technique by which both images displayed on a display panel but also real objects behind the display panel can be seen, and is widely applied to show windows, exhibition booths, vehicle windows and the like.

Generally, a transparent display comprises a display panel made of a transparent glass or the like, and the display panel includes transparent zones for displaying the real objects therebehind and display zones for displaying images for example by the liquid crystal display technique.

FIG. 1 shows a structure of a transparent display in the prior art. As shown in FIG. 1, the transparent display comprises a transparent display panel 01, a housing 011, a support stage 013 disposed in the housing for support a real object 02 and a light source 012 disposed on the housing for emitting light to the real object. The display panel 01 is disposed at an opening at a side of the housing 100. The light source 012 emits light toward the real object 02. The light is irradiated onto the real object 02 in the housing 011 and then a part of the light is reflected toward the display panel 01 to realize the display of the transparent display.

However, such transparent display comprises the housing having a larger volume, resulting in a heavy structure, and it is inconvenient to adjust a position of the display panel relative to the real object, thus restricting applicable range of the display.

SUMMARY OF THE INVENTION

The present invention provides a guide light plate, a backlight assembly and a transparent display to overcome or alleviate at least one of the disadvantages in the prior art.

According to an embodiment of the present invention, there is provided a light guide plate for a backlight assembly of a transparent display, comprising: a transparent plate body including a light exiting surface perpendicular to a thickness direction of the light guide plate and a light incident surface perpendicular to the light exiting surface, the light from the light source is introduced into the light guide plate through the light incident surface, and the light introduced into the light guide plate through the light incident surface exiting from the light guide plate through the light exiting surface; and a plurality of reflecting means disposed within the plate body, the plurality of reflecting means are configured to reflect the light introduced into the plate body from the light incident surface toward a plurality of light exiting zones on the light exiting surface of the plate body, wherein an area of a projection of each reflecting means on a plane perpendicular to the thickness direction of the light guide plate is equal to that of a projection of each light exiting zone on the plane.

The body of the light guide plate has a plurality of light exiting zones and the reflecting means are provided in the body. In a backlight assembly employing the light guide plate and a transparent display having the backlight assembly, a light source module of the backlight assembly emits light. The light irradiates onto the light incident surface and enters the body of the light guide plate through the light incident surface. The light introduced into the body of the light guide plate is guided toward the plurality of light exiting zones by the reflecting means in the light guide plate and exits out of the body of the light guide plate from the light exiting zones, and then enters the transparent display panel from the display zones of the transparent display panel of the transparent display so as to supply a light source for the display of the display panel of the transparent display. Further, the area of a projection of each of the reflecting means on a plane parallel with the light exiting surface of the plate body is equal to that of a projection of each of the light exiting zones on the plane. Therefore, the transparent display having the backlight assembly can display a real object therebehind through the zones of the light exiting surface of the body of the light guide plate other than the light exiting zones, which is defined as transmitting zones, while the reflecting means disposed in the body of the light guide plate will not affect transparent display effect of the transparent display.

When the transparent display is used in a dark environment, the light source for the display of the display panel can be provided by the backlight assembly having the light guide plate as described above, resulting in a reduced volume of the transparent display as compared with the display having the housing as in the prior art. Further, since the real object is positioned outside the transparent display, it is possible to adjust a position of the transparent display relative to the real object, thereby expanding the applicable range of the transparent display.

According to another embodiment of the present invention, there is provided a backlight assembly for a transparent display comprising: a light source module including a supporting frame and a light source array mounted on the supporting frame for emitting parallel light; and a light guide plate including: a transparent plate body including a light exiting surface perpendicular to a thickness direction of the light guide plate and a light incident surface perpendicular to the light exiting surface, the light from the light source module introduced into the light guide plate through the light incident surface, and the light introduced into the light guide plate through the light incident surface exiting the light guide plate through the light exiting surface; and a plurality of reflecting means disposed within the plate body, the plurality of reflecting means are configured to reflect the light introduced from the light incident surface of the plate body toward a plurality of light exiting zones on the light exiting surface of the plate body, wherein an area of a projection of each reflecting means on a plane perpendicular to the thickness direction of the light guide plate is equal to that of a projection of each light exiting zone on the plane.

According to yet another embodiment of the present invention, there is provided a transparent display comprising a display panel; and the backlight assembly as described above, wherein the display panel is located on a side of the light exiting surface of the light guide plate, the display pane has a plurality of display zones each corresponding to one of the light exiting zones of the body of the light guide plate respectively, each pair of the display zone and the light exiting zone are disposed opposite to each other, and zones other than the display zones are defined as transparent zones for displaying through the display penal an object behind the display panel.

In the transparent display described above, each of the display zones of the display panel corresponds to one of the light exiting zones of the body of the light guide plate respectively, and each of the transparent zones of the display panel corresponds to one of the transmitting zones of the body of the light guide plate respectively. Therefore, the display source of the display panel may be provided by the backlight assembly when the transparent display is used in a dark environment without affecting the transparence of the transparent display, and the display performance of the transparent display is independent from the position of the real object therebehind. Therefore, the transparent display has a wide applicable range.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
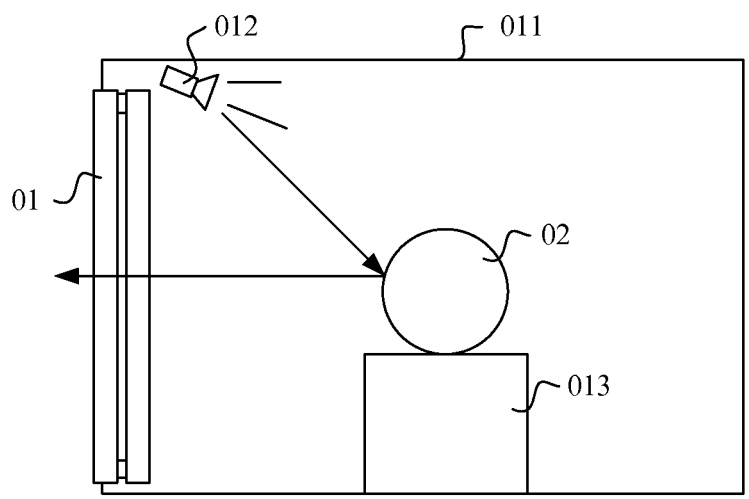
FIG. 1 is a schematic structural view of a transparent display in the prior art.

An exemplary embodiment of the present invention will be described below with reference to the accompanying drawings. In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
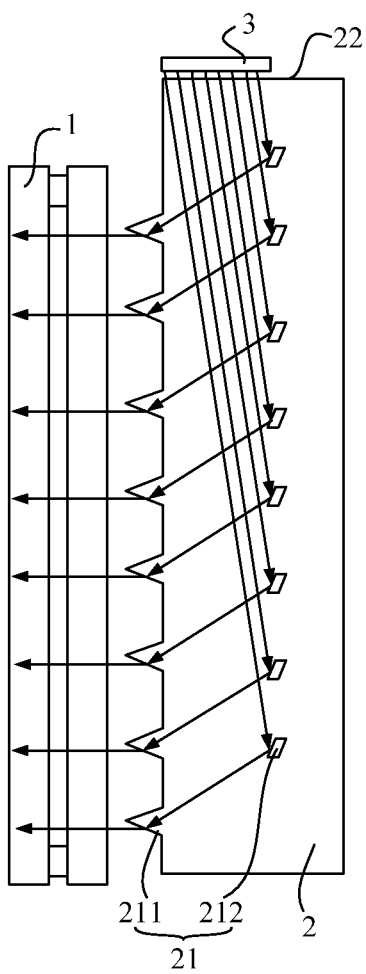
FIG. 2 is a schematic side view of a transparent display according to an embodiment of the present invention.

FIG. 2 shows a structural schematic view of a transparent display according to an embodiment of the present invention.

The present embodiment provides a light guide plate. For the convenience of description, when describing the light guide plate, reference has made to a backlight assembly, a light source module in the backlight assembly, a transparent display, a display panel in the transparent display, display zones and transparent zones of the display panel and the like. Here, the display zones of the display panel refer to zones for displaying images, and zones of the display panel other than the display zones are used for watching a real object behind the display panel and may be referred to as the transparent zones of the display panel.

As shown in FIG. 2, the light guide plate of a backlight assembly in the transparent display according to the present embodiment comprises a transparent plate body 2 which includes a light exiting surface perpendicular to a thickness direction of the plate and a light incident surface 22 perpendicular to the light exiting surface. The light from a light source module 3 enters the light guide plate 2 through the light incident surface 22, and the light introduced into the light guide plate 2 exits from the light guide plate through the light exiting surface of the light guide plate.

The light guide plate further comprise a plurality of reflecting means 212 disposed within the plate body 2, and the plurality of reflecting means 212 are configured to reflect the light introduced into the plate body through the light incident surface 22 toward a plurality of light exiting zones on the light exiting surface of the plate body.

An area of a projection of each reflecting means 212 on a plane perpendicular to the thickness direction of the plate body is equal to that of a projection of each light exiting zone on the plane.

Figure 4:
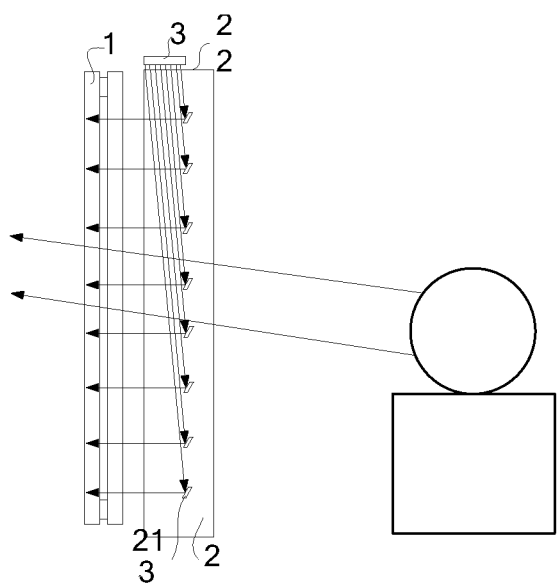
FIG. 4 is a schematic view showing the the transparent display of FIG. 3 in use.

The light exiting surface of the plate body 2 of the light guide plate has the plurality of light exiting zones and a plurality of light transmitting zones except the plurality of light exiting zones, and the reflecting means 212 are provided inside the body 2. In a backlight assembly employing the light guide plate and a transparent display having the said backlight assembly, the light source module 3 of the backlight assembly emits parallel light. The parallel light incident on the light incident surface 22 and are introduced into the body 2 of the light guide plate. The parallel light introduced into the body 2 of the light guide plate are reflected toward the plurality of light exiting zones by the plurality of light reflecting means 212 of the light guide plate and exit the body 2 of the light guide plate from the light exiting zones respectively, and then enter the display zones of the display panel 1 of the transparent display to supply the light source for the display of the display panel 1 of the transparent display. Further, a projection of each of the reflecting means 212 on a plane perpendicular to the thickness direction of the plate body 2 corresponds to a projection of each of the light exiting zones on the plane, respectively. That is, the area of the projection of each of the reflecting means 212 on a plane perpendicular to the thickness direction of the plate body 2 is equal to an area of a projection of each of the light exiting zones on the plane, respectively. Therefore, as shown in FIG. 4, the transparent display can show the real object therebehind through the transmitting zones of the body 2 of the light guide plate while the reflecting means 212 disposed within the body 2 of the light guide plate will not affect transparent display effect of the transparent display.

Here, the light exiting zones refer to the zones on the light exiting surface onto which the light reflected by the reflecting means are projected. Other zones on the light exiting surface other than the light exiting zones, i.e., zones onto which no reflected light are projected, are referred to as the transmitting zones.

Therefore, when the transparent display is used in a dark environment, the light source for the display of the display panel can be provided by the backlight assembly having the light guide plate as described above irrespective of the position of the real object behind the display panel, thereby expanding the applicable range of the transparent display.

Figure 3:
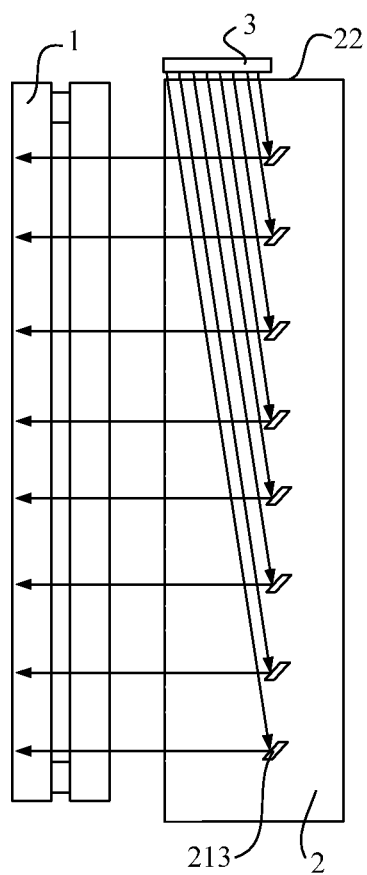
FIG. 3 is a schematic side view of a transparent display according to another embodiment of the present invention.

In an embodiment according to the present invention, as shown in FIG. 3, the light guide plate may comprise a plurality of first reflecting means 213 located within the body 2 and formed with reflecting surfaces each corresponding to one of the plurality of light exiting surfaces respectively. For each pair of the reflecting surface and the light exiting zone, the light irradiated onto the reflecting surface from the light source module 3 of the backlight assembly through the light incident surface 22 of the body 2 strikes onto the light exiting zone after being totally reflected by the reflecting surface and then exiting out of the body 2 of the light guide plate though the light exiting zone. Since each of the display zones in the display panel 1 of the transparent display is disposed to correspond to one of the light exiting zones of the body of the light guide plate and opposite thereto respectively, the light exiting out of the body 2 of the light guide plate from each light exiting zone is introduced into the display panel through a corresponding one of the display zones in the display panel 1 to supply the light source to the display zones in the display panel 1.

The plurality of first reflecting means 213 may be a plurality of metal reflecting layers disposed in the body 2, and a surface of each of the metal reflecting layers is formed as the reflecting surface of each first reflecting means 213.

Alternatively, the plurality of first reflecting means 213 may be a plurality of cavities formed in the body 2, and a wall surface of each of the cavities is formed as the reflecting surface of each first reflecting means 213.

In another embodiment according to the present invention, as shown in FIG. 2, the light guide plate may comprise a plurality of second reflecting means 212 located in the body 2 and formed with reflecting surfaces each corresponding to one of the light exiting surfaces respectively, and a plurality of refractive protuberances 211 disposed on the light exiting surface of the body of the light guide plate each corresponding to one of the reflecting surface respectively. The second reflecting means 212 and the refractive protuberances 211 constitute a light guide mechanism 21. In this embodiment, the light emitting zones are disposed in the refractive protuberances 211. For each pair of the reflecting surface and the refractive protuberance 211 corresponding with each other, the light irradiated onto the reflecting surface from the light source module 3 of the backlight assembly through the light incident surface 22 of the body 2 strikes onto the refractive protuberance 211 after being totally reflected by the reflecting surface and then exiting out of the body 2 of the light guide plate from the light emitting zone in the refractive protuberance 211. Since each of the display zones in the display panel of the transparent display is disposed to correspond to one of the light exiting zones of the body of the light guide plate and opposite thereto respectively, the light guided out of the body 2 of the light guide plate from each light exiting zone is introduced into the display panel through each corresponding display zone in the display panel 1 to supply the light source to the display zones in the display panel 1.

As shown in FIG. 2, each of the second reflecting means 212 is aligned with each of the refractive protuberances 211 horizontally, so that the real object behind the transparent display can be seen easily in a horizontal direction.

Similarly, the plurality of second reflecting means 212 may be a plurality of metal reflecting layers located in the body 2, and a surface of each of the metal reflecting layers is formed as the reflecting surface of each of the second reflecting means 212.

Alternatively, the plurality of second reflecting means 212 may be a plurality of cavities formed in the body 2, and a wall surface of each of the cavities is formed as the reflecting surface of each of the second reflecting means 212.

Another embodiment according to the present invention provides a backlight assembly having the light guide plate as shown in FIG. 2 or 3. For the convenience of description, when describing the backlight assembly, reference will be made to a transparent display, a display panel in the transparent display, display zones and transparent zones in the display panel and the like.

Continue to refer to FIG. 2 to 4, the backlight assembly according to an embodiment of the present invention comprises a light guide plate and a light source module 3. The light guide plate comprises a transparent plate body 2 which has a plurality of transmitting zones and a plurality of light exiting zones, and a plurality of reflecting means 212 or 213 for guiding light introduced through the light incident surface 22 of the body toward the plurality light exiting zones, wherein an area of a projection of each of the reflecting means on a plane perpendicular to a thickness direction of the light guide plate is equal to an area of a projection of one of the light emitting zones of the light guide plate. The light source module 3 is located on a side of the light incident surface 22 of the body 2 of the light guide plate. The light source module 3 includes a supporting frame and a plurality of light sources installed on the supporting frame for emitting parallel light.

In an embodiment according to the present invention, as shown in FIG. 3, the light guide plate may comprises a plurality of first reflecting means 213 located in the body 2 and formed with reflecting surfaces each corresponding to one of the plurality of light exiting surfaces respectively. In each pair of the reflecting surface and the light exiting zone, the light irradiated onto the reflecting surface from the light source module 3 of the backlight assembly through the light incident surface 22 is guided to the light exiting zone after being totally reflected by the reflecting surface and then guided out of the body 2 of the light guide plate from the light exiting zone. Since each of the display zones in the display panel 1 of the transparent display is disposed to correspond to one of the light exiting zones of the body of the light guide plate and opposite thereto respectively, the light guided out of the body 2 of the light guide plate from each light exiting zone is introduced into the display panel through one corresponding display zone in the display panel 1 to supply the light source to the display zone in the display panel 1, respectively.

The plurality of first reflecting means 213 may be a plurality of metal reflecting layers disposed in the body 2, and a surface of each of the metal reflecting layers is formed as the reflecting surface of each first reflecting means 213.

Alternatively, the plurality of first reflecting means 213 may be a plurality of cavities formed in the body 2, and a wall surface of each of the cavities is formed as the reflecting surface of each first reflecting means 213.

In another embodiment according to the present invention, as shown in FIG. 2, the light guide plate may comprise a plurality of second reflecting means 212 located in the body 2 and formed with reflecting surfaces, and a plurality of refractive protuberances 211 disposed on the light exiting surface of the body of the light guide plate each corresponding to one of the reflecting surface respectively. The light emitting zones are disposed in the refractive protuberances 211. For each pair of the reflecting surface and the refractive protuberance 211 corresponding with each other, the light irradiated onto the reflecting surface from the light source module 3 of the backlight assembly through the light incident surface 22 of the body 2 strikes onto the refractive protuberance 211 after being totally reflected by the reflecting surface and then exiting out of the body 2 of the light guide plate from the light emitting zone in the refractive protuberance 211. Since each of the display zones in the display panel of the transparent display is disposed to correspond to one of the light exiting zones of the body of the light guide plate and opposite thereto respectively, the light guided out of the body 2 of the light guide plate from each light exiting zone is introduced into the display panel through each corresponding display zone in the display panel 1 to supply the light source to the display zone in the display panel 1, respectively.

Similarly, the plurality of second reflecting means 212 may be a plurality of metal reflecting layers located in the body 2, and a surface of each of the metal reflecting layers is formed as the reflecting surface of each of the second reflecting means 212.

Alternatively, the plurality of second reflecting means 212 may be a plurality of cavities formed in the body 2, and a wall surface of each of the cavities is formed as the reflecting surface of each of the second reflecting means 212.

The light source device 3 may be constructed in various manners.

In an embodiment of the present invention, as shown in FIGS. 2 and 3, the light source module 3 comprises the supporting frame and a light source array supported by the supporting frame for emitting parallel light, the light source array may be one consisting of a plurality of point light sources aligned in an array on the supporting frame for emitting parallel light, wherein in the thickness direction of the light guide plate, each row of parallel light sources corresponds to one reflecting surface of the reflecting means 212 or 213 and the reflecting surfaces corresponding to any two adjacent rows of parallel light sources are adjacent with each other. The parallel light emitting by each row of the parallel light sources is introduced into the body 2 of the light guide plate through the light incident surface 22 of the body 2 of the light guide plate and then irradiate onto the reflecting surface corresponding to the row of the parallel light sources.

When the light guide plate is the one as shown in FIG. 3, the light irradiating onto the reflecting surfaces of the first reflecting means 213 are guided to respective light emitting zones after being totally reflected by the reflecting surfaces and then exit the body 2 of the light guide plate. When the light guide plate is the one as shown in FIG. 2, the light irradiating onto the reflecting surfaces of the second reflecting means 212 are guided to respective refractive protuberances 211 after being totally reflected and then guided out of the body 2 of the light guide plate through the refractive protuberances 211.

Figure 5:
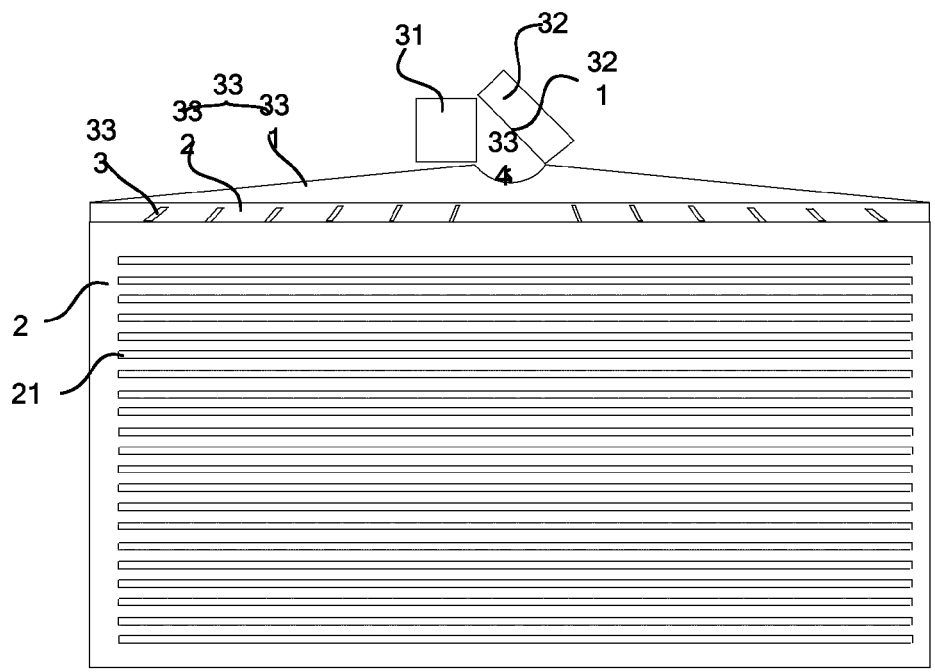
FIG. 5 is a schematic front view showing a light guide plate and a light source module in a transparent display according to another embodiment of the present.
Figure 6:
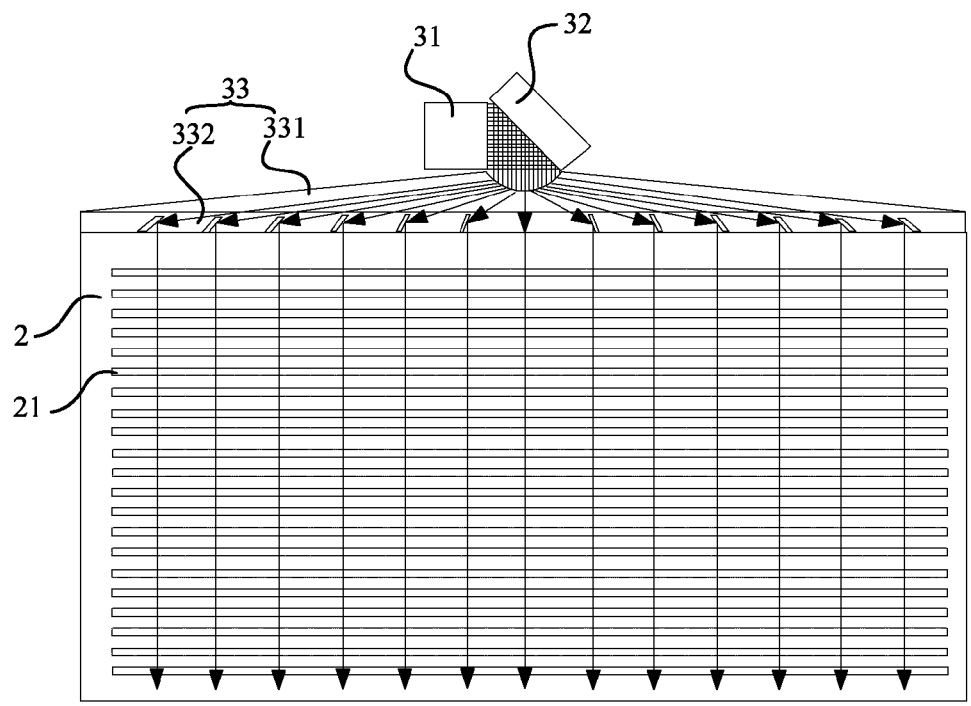
FIG. 6 is a schematic front view showing the propagation of light between the light guide plate and the light source module shown in FIG. 5.
Figure 7:
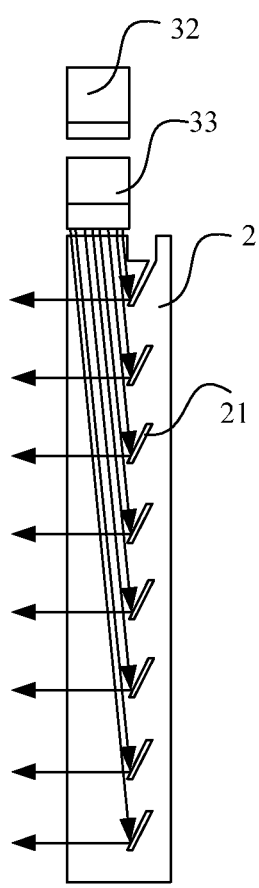
FIG. 7 is a schematic side view showing the propagation of the light after entering the light guide plate as shown in FIG. 5.

In another embodiment of the present invention, as shown in FIGS. 5 to 7, the light source device 3 comprises a supporting frame 31, a light source array supported by the supporting frame for emitting parallel light, a reflecting block 32 and a light guide member 33.

Specifically, the light source array is mounted on one surface of the supporting frame 31 facing the reflecting block 32.

The reflecting block 32 has a reflective surface 321.

The light guide member 33 is formed with an arc light incident surface 334 which has a central axis parallel with the thickness direction of the body of the light guide plate at a side surface facing away from the body 2 of the light guide plate, and a surface of the light guide member 33 facing the body 2 of the light guide plate is formed as a light exiting surface, which is opposite to the light incident surface 22 of the body 2 of the light guide plate. The light guide member 33 includes a plurality of light reflecting means 333 therein, and the plurality of light reflecting means 333 have a plurality of reflecting surfaces respectively to reflect the light guided into the light guide member 33 through the arc light incident surface 334 toward the light exiting surface of the body 2 of the light guide plate.

The light source array on the supporting frame 31 emits parallel light, and the light irradiates onto the reflective surface 321 of the reflecting block 33 and is incident on the arc light incident surface 334 of the light guide member 33 after being reflected by the reflective surface 321. The light guided into the light guide member 33 through the arc light incident surface 334 is refracted and diffused by the arc light incident surface 334, and the diffused light irradiates on the reflecting surfaces of the light reflecting means 333 respectively and is reflected toward and exits from the light exiting surface of the light guide member 33. The light exiting from the light guide member 33 through the light exiting surface thereof are guided into the body 2 of the light guide plate through the light incident surface thereof.

The reflecting block 32 may be a reflecting plate which is controlled by a micro electromechanical system to achieve a micro-control of an angle between the reflective surface 321 of the reflecting block 32 and the parallel light emitted by the parallel light sources.

Specifically, the light guide member 33 includes a diffusing plate 331 and a reflecting plate 332. The diffusing plate 331 is located on one side of the reflecting plate 331 facing away from the body 2 of the light guide plate. The arc light incident surface 334 is disposed on a side surface of the diffusing plate 331 facing the supporting frame 31 and the reflecting block 32. A side of the diffusing plate 331 facing the body 2 of the light guide plate is opposite to a side of the reflecting plate 332 facing away from the body 2 of the light guide plate, and the light reflecting means 333 are disposed within the reflecting plate 331.

The plurality of light reflecting means 333 may be a plurality of metal reflecting layers provided within the reflecting plate 332 respectively, and one surface of each of the metal reflecting layers is formed as the reflecting surface of each light reflecting means 333.

Alternatively, the plurality of light reflecting means 333 may be a plurality of strip cavities formed within the reflecting plate 332, and a wall surface of each of the cavities is formed as the reflecting surface of each light reflecting means 333.

In yet another embodiment of the present invention, the light source module comprises a supporting frame and a plurality of light source arrays supported by the supporting frame for emitting parallel light. The light source module further comprises a light guide member.

Specifically, the supporting frame is located on a side of the light guide member facing away from the body 2 of the light guide plate, and the light source arrays is mounted on a surface of the supporting frame facing the light guide member, The light guide member 33 is formed as an arc light incident surface 334 which has a central axis parallel with the thickness direction of the light guide plate at a side surface facing away from the body 2 of the light guide plate, and a surface of the light guide member 33 facing the body 2 of the light guide plate is formed as a light exiting surface opposite to the light incident surface of the body 2 of the light guide plate. The light guide member includes a plurality of light reflecting means therein, and the light reflecting means are formed with a plurality of reflecting surfaces to reflect the light guided into the light guide member through the arc light incident surface toward the light exiting surface of the light guide member.

The light source array on the supporting frame emits parallel light, and the parallel light incident the arc light incident surface of the light guide member and is refracted by the arc light incident surface to diffuse in the light guide member. The diffused light is incident onto the respective reflecting surfaces of the light reflecting means in the light guide member and is reflected toward and exits from the light exiting surface of the light guide member. The light exiting from the light guide member through the light exiting surface thereof is guided into the body 2 of the light guide plate through the light incident surface thereof.

The light guide member may include a diffusing plate and a reflecting plate. The diffusing plate is located on one side of the reflecting plate facing away from the body 2 of the light guide plate. The arc light incident surface is disposed on a side surface of the diffusing plate facing the supporting frame. A surface of the diffusing plate facing the body 2 of the light guide plate is opposite to a surface of the reflecting plate facing away from the body 2 of the light guide plate, and the light reflecting means are disposed within the reflecting plate.

More particularly, the plurality of the light reflecting means may be a plurality of metal reflecting layers located in the reflecting plate respectively, and a surface of each of the metal reflecting layers is formed as the reflecting surface of each light reflecting means.

Alternatively, the plurality of the light reflecting means may be a plurality of strip cavities located in the reflecting plate respectively, and a wall surface of each of the cavities is formed as the reflecting surface of each light reflecting means.

In an embodiment according to the present invention, each light source in the light source array of the light source module 3 in the backlight assembly is a monochromatic light source. That is, the backlight assembly can provide parallel monochromatic light of different colors according to the requirements of the display panel in the transparent display, and thus the display panel can display different colors even without a color filter, thereby the utilization of the light emitted by the light sources can be improved.

In another embodiment of the present invention, as shown in FIG. 2 to 4, there is provided a transparent display comprising a display panel 1 and the backlight assembly as described above.

The display panel 1 is located on a light emitting side of the body 2 of the light guide plate of the backlight assembly. The display panel 1 has a plurality of transparent zones each corresponding to one of the transmitting zones of the body 2 of the light guide plate respectively and a plurality of display zones each corresponding to one of the light exiting zones of the body 2 of the light guide plate respectively. Each pair of the transparent zone and the transmitting zone are disposed opposite to each other, and each pair of the display zone and the light exiting zone are disposed opposite to each other.

In the transparent display described above, each of the display zones of the display panel 1 corresponds to one of the light exiting zones of the body 2 of the light guide plate respectively, and each of the transparent zones of the display panel 1 corresponds to one of the transmitting zones of the body 2 of the light guide plate respectively. Therefore, the light source for the display of the display panel can be provided by the backlight assembly when the transparent display is used in a dark environment, and the transparency of the transparent display will not be affected. Further, the display performance of the transparent display is independent from the position of the real object therebehind.

Therefore, the transparent display has a wide applicable range.

In addition, the brightness of the transparent display can be adjusted by adjusting the luminance of the light source in the light source module 3 to increase the brightness of the transparent display or the contrast between the brightness of the transparent display and the brightness of ambient environment.

In an embodiment of the present invention, when the plurality of parallel light sources of the light source module 3 in the backlight assembly emit monochromatic light, each display zone has a row of sub-pixel units corresponding to the same color in the display panel 1.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A light guide plate for a backlight assembly of a transparent display, comprising:
    a transparent plate body including a light exiting surface perpendicular to a thickness direction of the light guide plate and a light incident surface perpendicular to the light exiting surface, light from a light source being introduced into the light guide plate through the light incident surface, and the light introduced into the light guide plate through the light incident surface being emitted out of the light guide plate through the light exiting surface; and
    a plurality of reflecting means disposed within the plate body, the plurality of reflecting means being configured to reflect the light introduced through the light incident surface of the plate body toward a plurality of light exiting zones on the light exiting surface of the plate body respectively,
    wherein an area of a projection of each reflecting means on a plane perpendicular to the thickness direction of the light guide plate is equal to that of a projection of each light exiting zone on the plane; and
    wherein the light exiting surface of the plate body further comprises a plurality of light transmitting zones disposed between the plurality of light exiting zones, respectively, the plurality of light transmitting zones being configured to show an object behind the transparent display.

2. The light guide plate according to claim 1, further comprising:
    a plurality of refractive protuberances disposed on the light exiting surface of the plate body and each corresponding to one of the plurality of reflecting means respectively,
    wherein the plurality of light exiting zones are disposed on the plurality of refractive protuberances respectively, and the light irradiating onto the plurality of reflecting means is reflected onto the respective refractive protuberances by the plurality of the reflecting means and exits from the light guide plate after being refracted by the refractive protuberances.

3. The light guide plate according to claim 2, wherein each of the reflecting means includes:
    a metal reflecting layer disposed in the plate body, a surface of the metal reflecting layer being formed as a reflecting surface of the reflecting means; or a cavity formed in the body, a side wall surface of the cavity being formed as a reflecting surface of the reflecting means.

4. A backlight assembly for a transparent display, comprising:
a light source module including a supporting frame and a light source array mounted on the supporting frame for emitting parallel light; and
a light guide plate including:
a transparent plate body including a light exiting surface perpendicular to a thickness direction of the light guide plate and a light incident surface perpendicular to the light exiting surface, the light from the light source module being introduced into the light guide plate through the light incident surface, and the light introduced into the light guide plate through the light incident surface being emitted out of the light guide plate through the light exiting surface; and
a plurality of reflecting means disposed within the plate body, the plurality of reflecting means being configured to reflect the light introduced from the light incident surface of the plate body toward a plurality of light exiting zones on the light exiting surface of the plate body respectively,
wherein an area of a projection of each reflecting means on a plane perpendicular to the thickness direction of the light guide plate is equal to that of a projection of each light exiting zone on the plane; and
wherein the light exiting surface of the plate body further comprises a plurality of light transmitting zones disposed between the plurality of light exiting zones, respectively, the plurality of light transmitting zones being configured to show an object behind the transparent display.

5. The backlight assembly according to claim 4, wherein the light guide plate further comprises a plurality of refractive protuberances disposed on the light exiting surface of the plate body and each corresponding to one of the plurality of reflecting means respectively,
wherein the plurality of light exiting zones are disposed on the plurality of refractive protuberances respectively, and the light irradiating onto the plurality of reflecting means are reflected onto the respective refractive protuberances by the plurality of reflecting means and exit from the light guide plate after being refracted by the refractive protuberances.

6. The backlight assembly according to claim 5, wherein each of the reflecting means includes:
a metal reflecting layer disposed in the plate body, a surface of the metal reflecting layer being formed as a reflecting surface of the reflecting means; or
a cavity formed in the body, a side wall surface of the cavity being formed as a reflecting surface of the reflecting means.

7. The backlight assembly according to claim 5, wherein the light source array includes a plurality of rows of light sources arranged in the thickness direction of the plate body of the light guide plate, the plurality of rows of light sources corresponding to the plurality reflecting means respectively, the parallel light emitted by each row of light sources irradiating onto a corresponding one of the plurality of reflective means through the light incident surface of the light guide plate.

8. The backlight assembly according to claim 5, wherein the light source module further includes:

a reflecting block arranged to face toward the light source array to receive and reflect the parallel light emitted from the light source array; and
a light guide member including:
a light exiting surface opposite to the light incident surface of the body of the light guide plate;
an arc-shaped light incident surface formed on a surface of the light guide member facing away from the light incident surface of the plate body of the light guide plate and having a central axis parallel with the thickness direction of the body of the light guide plate, the arc-shaped light incident surface being configured to receive the parallel light reflected by the reflecting block and diffuse the received parallel light toward an inside of the light guide member; and
a plurality of light reflecting devices formed within the light guide member for reflecting the light introduced into the light guide member through the arc-shaped light incident surface toward the light exiting surface of the light guide member to be introduced into the plate body of the light guide plate through the light incident surface of the plate body of the light guide plate after exiting out of the light guide member through the light exiting surface thereof.

9. The backlight assembly according to claim 5, wherein the light source module further includes a light guide member for receiving parallel light emitted from the light source array, wherein the light guide member includes:
a light exiting surface opposite to the light incident surface of the plate body of the light guide plate;
an arc-shaped light incident surface formed on a surface of the light guide member facing away from the light incident surface of the plate body of the light guide plate and having a central axis parallel with the thickness direction of the body of the light guide plate, the arc-shaped light incident surface being configured to receive the parallel light emitted by the light source array and diffuse the received parallel light toward an inside of the light guide member; and
a plurality of light reflecting means formed within the light guide member for reflecting the light introduced into the light guide member through the arc-shaped light incident surface toward the light exiting surface of the light guide member to be introduced into the plate body of the light guide plate through the light incident surface of the plate body of the light guide plate after exiting out of the light guide member through the light exiting surface thereof.

10. The backlight assembly according to claim 8, wherein the light guide member includes a diffusing plate and a reflecting plate arranged sequentially from a side of the light source array;
the arc-shaped light incident surface is disposed on a side of the diffusing plate facing the light source array; and
the light reflecting means of the light guide member are disposed within the reflecting plate.

11. The backlight assembly according to claim 9, wherein, the light guide member includes a diffusing plate and a reflecting plate arranged sequentially from a side of the light source array;
the arc-shaped light incident surface is disposed on a side of the diffusing plate facing the light source array; and
the light reflecting means of the light guide member are disposed within the reflecting plate.

12. The backlight assembly according to claim 10, wherein each of the light reflecting devices of light guide member includes:

a metal reflecting layer disposed in the reflecting plate, a surface of the metal reflecting layer being formed as a reflecting surface; or a strip-like cavity disposed in the reflecting plate, a side wall surface of the cavity being formed as a reflecting surface.

13. The backlight assembly according to claim 4, wherein each row of the light sources in the light source array emit parallel monochromatic light.

14. A transparent display comprising:
a display panel; and
the backlight assembly according to claim 4,
wherein the display panel is located on a side of the light exiting surface of the light guide plate, the display pane has a plurality of display zones each corresponding to and facing one of the light exiting zones of the plate body of the light guide plate respectively, and the zones of the display panel other than the display zones are transparent zones for showing an object behind the display panel.

15. The transparent display according to claim 14, wherein when the light source array of the light source module in the backlight assembly emits parallel monochromatic light, each display zone of the display panel has a row of sub-pixel units for displaying the same color.

* * * * *